Sept. 22, 1942.  A. S. McINTIRE  2,296,477
INTER-GEARED MEANS FOR ADJUSTING PLURAL CRANK ARM LENGTHS IN GAS METERS
Filed April 22, 1941  2 Sheets-Sheet 1
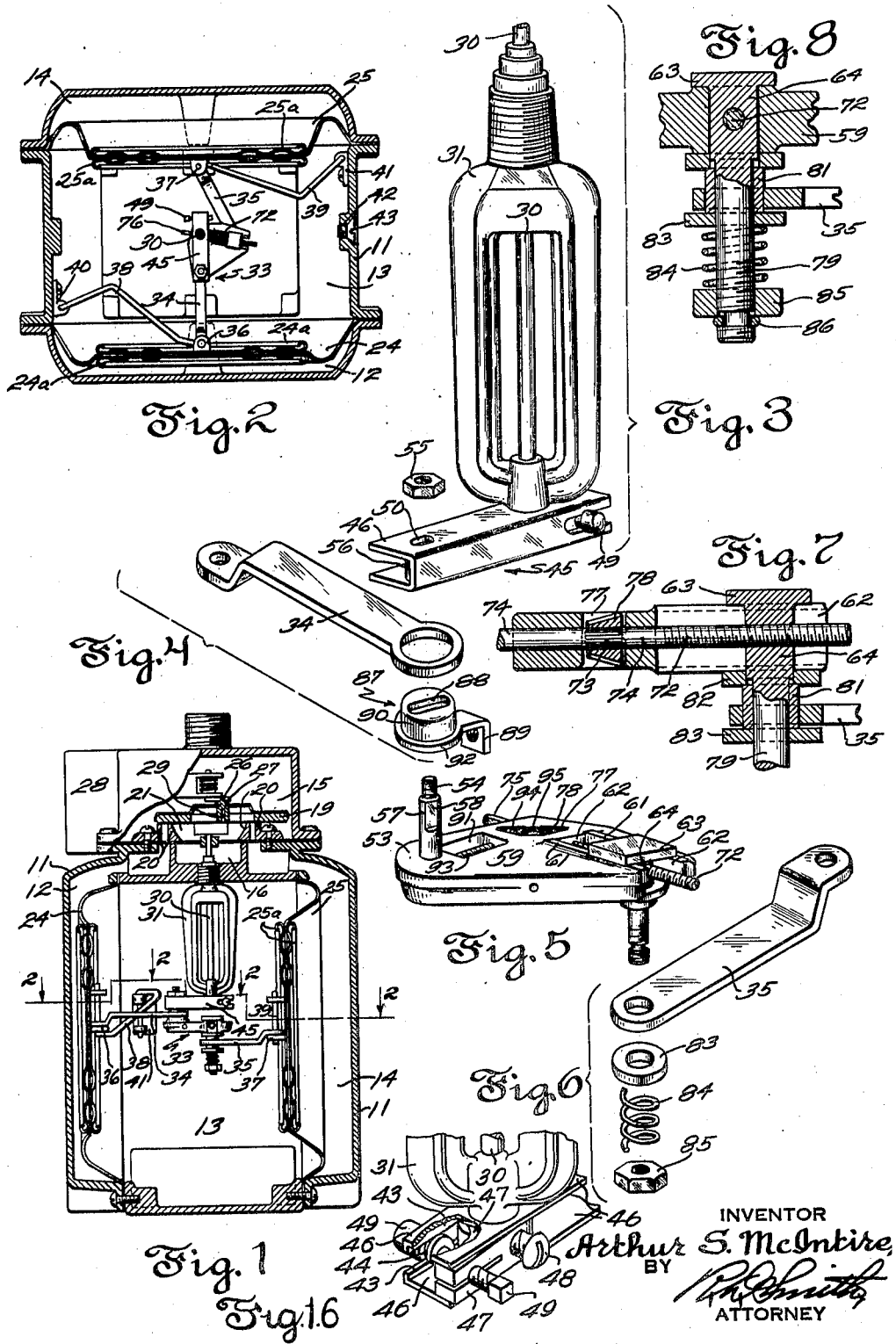
INVENTOR
Arthur S. McIntire,
BY
ATTORNEY

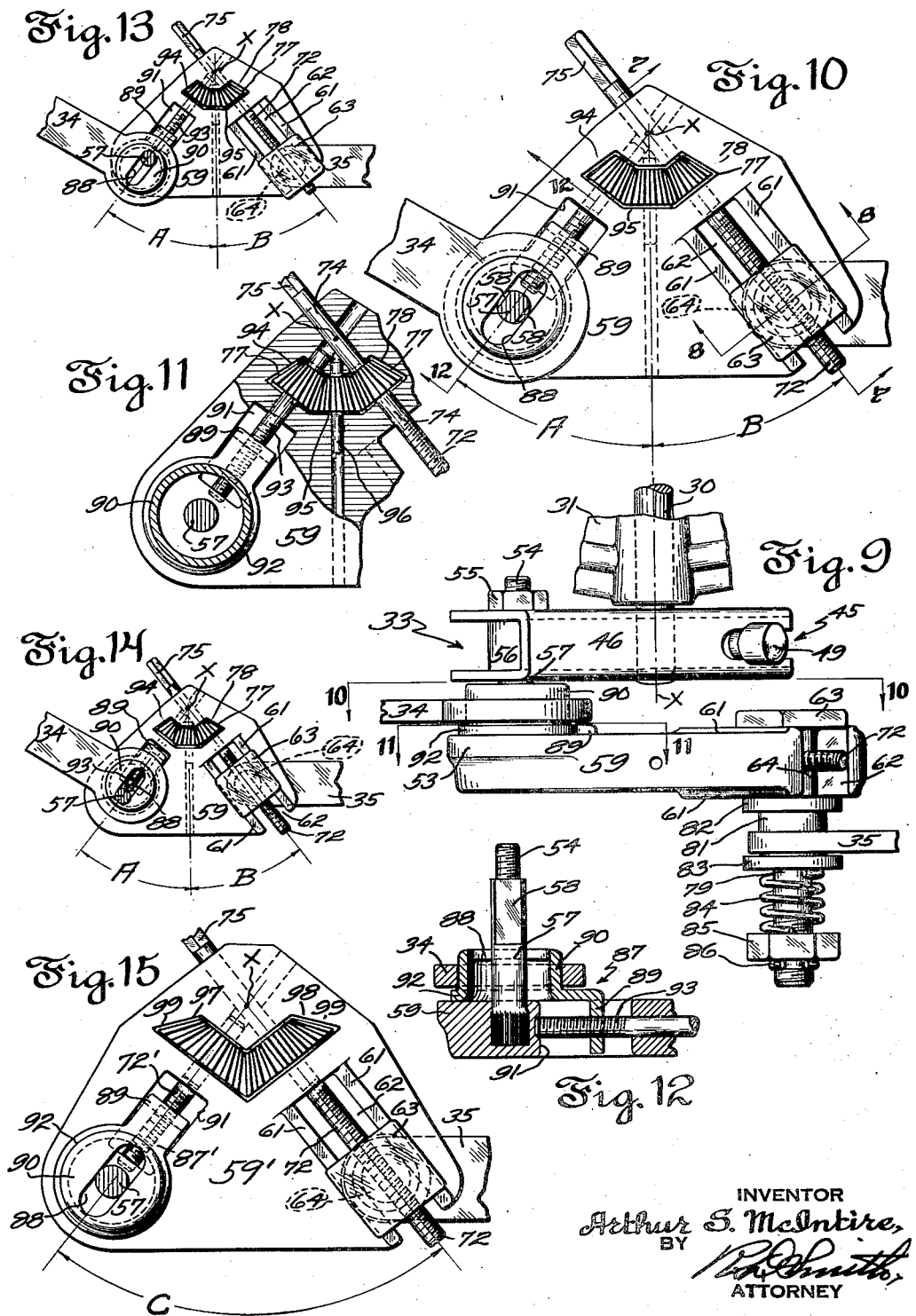

Patented Sept. 22, 1942

2,296,477

UNITED STATES PATENT OFFICE 2,296,477

INTER-GEARED MEANS FOR ADJUSTING PLURAL CRANK ARM LENGTHS IN GAS METERS

Arthur S. McIntire, Bridgeport, Conn., assignor to The Sprague Meter Company, Bridgeport, Conn., a corporation of Connecticut Application April 22, 1941, Serial No. 389,717

18 Claims. (Cl. 73—281)

This invention relates to mechanisms for varying simultaneously and to like extent the distance through which multiple diaphragms in a gas meter are permitted to reciprocate while simultaneously linked to a multiple armed crank which assists in transmitting the diaphragm movements to the register of the meter.

One object of these improvements is to provide means whereby the adjustive shifting of some preferably single element which is accessible through an opening in the meter wall shall produce a like change in the effective length or "throw" of plural crank arms with respect to plural diaphragms, respectively, and in a mechanism where such diaphragms are connected to such crank arms by separate pitman links.

A further object is to provide means for varying, and preferably to like extent, the radially distances from the axis of a crank to a plurality of circumferentially spaced crank pins or like pivotal devices carried by the crank in a mechanism where such pivotal devices are engaged respectively by a plurality of pitman links whose paths of swinging travel overlap in neighboring parallel planes.

A still further object is to provide simple intergeared means for simultaneously varying to like extent the effective lengths of two angularly related crank arms for purposes analogous to those explained in the copending application of Arthur S. McIntire, Serial No. 219,851, filed July 18, 1938.

The above and related objects are explained in greater detail in the following description of structure illustrative of one possible form of the invention, in which description reference is had to the accompanying drawings wherein:

Fig. 1 is a view in side elevation of the diaphragm operated crank mechanism within a Sprague type of gas meter, the meter casing, framework and certain of the associated valve operating apparatus being broken away and shown in section.

Fig. 2 is a plan view taken in section on the planes 2—2—2—2 in Fig. 1.

Fig. 3 is an enlarged perspective view of the assembled bearing bracket, crank shaft and crank arm removed from the meter of Fig. 1.

Fig. 4 is an exploded perspective view, corresponding in scale and position with Fig. 3, showing one of the diaphragm connecting links with its adjustable crank connection collar separated therefrom.

Fig. 5 is a perspective view, corresponding in scale and position to Figs. 3 and 4, showing the crank plate and its carried parts.

Fig. 6 is an exploded perspective view, corresponding in scale and position to Figs. 3, 4 and 5, showing the other diaphragm connecting link with separated retaining means therefor.

Fig. 7 is a fragmentary view taken in section on the plane 7—7 in Fig. 10 looking in the direction of the arrows.

Fig. 8 is a fragmentary view taken in section on the plane 8—8 in Fig. 10 looking in the direction of the arrows.

Fig. 9 is an edgewise fragmentary view of the shaft carried adjustable crank structure approximately as appearing in Fig. 1 drawn on a larger scale.

Fig. 10 is a plan view taken in section on the plane 10—10 in Fig. 9.

Fig. 11 is a fragmentary plan view taken in section on the plane 11—11 in Fig. 9.

Fig. 12 is a fragmentary view taken in section on the plane 12—12 in Fig. 10, looking in the direction of the arrows.

Fig. 13 is a view similar to Fig. 10 drawn on a reduced scale showing the effective lengths of the crank arms increased to a maximum.

Fig. 14 is a view similar to Fig. 13 showing the effective lengths of the crank arms reduced to a minimum.

Fig. 15 is a plan view similar to Fig. 10 showing a modified construction of the intergearing connections.

Fig. 16 is a fragmentary perspective view of the adjustable connection between the crank structure and its shaft.

Figs. 1 and 2 illustrate a typical gas meter of the Sprague type in which the present improvements may be incorporated. Such meter may include a casing 11 containing three gas measuring chambers 12, 13 and 14, a distributing chamber 15 and an exhaust passageway 16. The usual flexible diaphragms 24 and 25 separate adjacent measuring chambers 12, 13 and 13, 14, respectively.

A centrally hollowed-out valve disc 19 gyrates edgewise in sliding contact with the upper valve seat edges of partitions 20 which separate adjacent passageways providing communication between distributing chamber 15 and measuring chambers 12, 13 and 14. This serves to open and close these passageways in predetermined sequence and timed relationship. Valve disc 19 further acts as a valve to control communication between the said passageways and a central well 21 giving to the exhaust passageway 16. By this valve action of disc 19, the flow of gas into and out of the measuring chambers is governed in a manner to cause reciprocative excursion of diaphragms 24 and 25 in a manner that is fully described in U. S. Patent No. 722,390, granted March 10, 1903, to Henry H. Sprague.

Disc 19 further carries a projecting boss 26 which revolves therewith and rotatively drives the radial arm 27 of the meter register 28 located at the top front portion of the meter. The bottom end of boss 26 is pivotally engaged by an upstanding driving pin 29 which revolves with the vertical crank shaft 30. This shaft is journaled in a bearing bracket 31 which depends from and is removably mounted in fixed relation to the interior frame-work of the meter. All of the meter parts and apparatus so far mentioned may be constructed and operate as is explained in greater detail in the copending application of Arthur S. McIntire, Serial No. 219,851.

The lower end of crank shaft 30 projects below the bottom end of bracket 31 and carries thereat a crank structure indicated as a whole by 33, shown most fully in Figs. 3, 5, 8, 9, 13 and 14. This crank structure is pivotally connected by pitman links 34, 35 to diaphragms 24 and 25, respectively, as best shown in Figs. 1 and 2. The central portions of these diaphragms are seen to include disc-like plates 24a and 25a clamping between them the flexible leather of the diaphragms and carrying respectively the hinge brackets 36 and 37. As in older patented constructions of the Sprague meter, and for steadying and guiding each diaphragm in a definite path of back-and-forth movement, the hinge brackets 36 and 37 are movably guided respectively by bent-rod arms 38 and 39 which are swingably mounted, respectively, in stationary hinge brackets 40 and 41 secured to walls of the casing structure within the central measuring chamber.

The beforementioned pitman links 34 and 35 have their diaphragm connecting ends pivotally coupled with the diaphragm carried hinge brackets 36 and 37, respectively, and their opposite ends are pivotally coupled with the crank structure 33. Important features of this crank structure as operatively related to pitman links 34 and 35 are novel with this invention.

The crank structure 33 includes a composite holding arm indicated as a whole by 45 which includes a rigid channel member 46 having an adjustment permitting fit upon shaft 30 below bracket 31. Channel member 46 contains, sandwiched between its top and bottom flanges and filling the space therebetween, a rocking lever 47 for purposes of holding member 46 in variously adjusted rotative relationships on shaft 30. This rocking lever is fixed in position on shaft 30 by means of set screw 48. As and for the purpose set forth in U. S. Patent No. 1,892,520, granted to H. H. Sprague, an adjusting screw 49 having groove 44 engaged in walls 43 of a slot in member 46 connects channel member 46 and rocking lever 47 in a manner to maintain and, when desired, to vary the angular relationship of member 46 and lever 47 and thereby the rotative relationship of member 46 to shaft 30. Further details of the construction at this point in the mechanism are described in a copending application of Fairchild Whitworth filed April 9, 1941, Serial No. 387,649. A flatted hole 50 through the top and bottom flanges of the free end of channel member 46 may thus be swung adjustively to different positively maintained rotative positions on shaft 30 by turning screw 48. This or equivalent means of adjustment is employed for timing or synchronizing the opening and closing of the ports or passageways controlled by the gyratory movement of disc 19 in relation to the excursions of movement performed by the diaphragms.

All the rest of the crank structure 33 is fixedly suspended from and axially spaced in relation to holding arm 45 by means of a vertical post 57 whose upper portion is flatted at 58 to fit tightly in the flatted holes 50 in the flanges of member 46. As shown in Fig. 9, a sleeve 56 surrounds pin 57 and internally reinforces the flanges of channel member 46 to help them withstand the pressure of a retaining nut 55 when the latter is set up in threaded engagement with the top end 54 of pin 57 for firmly clamping member 46 against the shoulders on pin 57 afforded by the bottom ends of the flats 58. The lower end of post 57 may be fixedly embedded in the thickened terminus 53 of one branch of a die casting forming the crank plate 59. Other suitable means for making post 57 fast both to channel member 46 and crank plate 59 may be employed. However, by the construction described, crank plate 59 while removable for repair is at all times carried as rigidly and held as fixedly in spaced relation to holding arm 45 as though these two sections of the crank structure 33 constituted an integral structure.

Crank plate 59 is provided with an elongated cutout 62 whose opposite edges are bordered at top and bottom by ridge-like guideways 61 along which a block 64 may adjustably be moved. Block 64 is preferable cylindrical and fills the width of cut-out 62 with a sliding fit. This block is provided with an enlarged overhanging head 63 which rests upon top guideways 61 and further has a downward extending shank 79 threaded for some distance from its lower end. Shank 79 is firmly maintained in perpendicular relationship to the plane of rotation of crank plate 59 by means of a thrust washer 82 which slidably surrounds block 64 and is constantly thrust upward against the bottom guideways 61 on crank plate 59 through the medium of a collar 81 and a washer 83 by the expansive force of a coil spring 84 retained by nut 85 having threaded engagement with shank 79. Nut 85 is guarded against excessive loosening by a horseshoe type of spring retainer 86 lodged in a groove cut in the threaded portion of shank 79. Collar 81 and washer 82 are freely slidable on shank 79. It will be observed that the thickness of thrust washer 82 is such that collar 81 exerts its thrust thereupon instead of against the shoulder where shank 79 joins block 64. Thus spring 84 acts to keep the plate guideways 61 squeezed between the block head 63 and thrust washer 82 so as to prevent all play between these parts and hold them steady in every adjusted position while affording frictionally opposed slidability to block 64 lengthwise of cut-out 62 in a straight path radial to the crank axis X.

Block 64 is moved to and held in selective stations lengthwise of cut-out 62 by the adjuster screw 72, one section of whose length occupies this cut-out centrally and has threaded engagement with a tapped hole in block 64. An unthreaded section 74 of the length of screw 72 is rotatably embedded in the material of the crank plate with a small enough degree of resistive tightness to enable said screw to be turned by means of its projecting head 75 which is flatted or squared to receive a socket wrench or other suitable tool (not shown). Such tool preferably may also fit and turn the head of the hereinbefore mentioned valve timing adjustment screw 49. Along the unthreaded shank 74 of screw 72, this shank surface is roughened by knurling as at 73 in a portion occupying one end of a three-part opening 77 in crank plate 59. This opening accommodates, and the side walls of one of its wings provide axial thrust for, a small bevel pinion 78 which is pressed tightly and fixedly onto the roughened periphery of screw shank 74. It may be noted in Fig. 2 that the squared or flatted heads of screws 49 and 72 can both and at the same time project toward a casing opening 42 in order that both screw heads may be reached for adjustively turning them by the same wrench inserted through this casing opening when crank structure 33 occupies a single position.

One end of pitman link 35 is pivotally engaged to the bushing 81 so that the radial distances from the axis of rotation of crank structure 33 to the point of pivotal connection of link 35 to the crank structure varies with adjustive movement of block 64 along its guiding plate cut-out 62. The objective of using intergeared means to cause a similar change in the radial distance from the aforesaid axis of crank rotation to the point of pivotal connection of pitman link 34 to the crank structure is accomplished by devices forming particular features of this invention.

The beforementioned post 57 is surrounded by a hollow, inverted, cup-shaped, shiftable collar 87 that functions for the purpose of an adjustable "crank pin." The roof wall of collar 87 contains an elongated diametrically extending slot 88. Post 57 extends through this slot, being of cross sectional size to fill the width thereof and to permit lateral sliding of collar 87 relative to post 57. But the slidability of collar 87 is strictly limited to a direction radially aligned with the axis of rotation of crank plate 59 by the engagement of an offset and downward extending lug 89 on collar 87 with both sides of a rectangular aperture 91 in crank plate 59. The cylindrical portion 90 of shiftable collar 87 is pivotally engaged by pitman link 34 and is seen to possess an annular bottom flange 92 by which it rests freely and slidably on the top surface of crank plate 59, flange 92 being broad enough to overlie the edges of aperture 91.

The intergeared mechanism for imparting radial adjustive movement to collar 87 simultaneously with, and to the same extent as, the adjustive movement imparted to block 64 includes a screw 93 having a threaded portion of its length centrally spanning the length of aperture 91 passing through a tapped hole in lug 89 in threaded engagement therewith. An unthreaded portion or bearing shank of screw 93 is rotatably embedded in crank plate 59 and is roughened or knurled to receive fixedly thereon with a tight fit the small bevel pinion 94. Screw 93 may or may not be given additional bearing in plate 59 at its left extremity in Fig. 12. Pinion 94 and pinion 78 are operatively coupled for turning in unison in the same rotative directions by means of idler pinion 95 which is fixed to a stub shaft 96 having free bearing at both ends in the metal of crank plate 59. Pinions 78, 95 and 94 occupy adjacent sections of the beforementioned opening 77 in the crank plate. Side walls of this opening at each end of each pinion serve as thrust bearings to maintain proper intermeshing of the pinions and to prevent longitudinal movement of screws 72 and 93.

In the operation of the meter the adjustable crank pin device 64, 79, etc. and also the collar device 87 are cooperatively pushed and pulled by the diaphragm motivated pitman links 34 and 35 in such manner as to impel crank structure 33 continually in a constant direction of rotation so long as gas continues to pass into and out of measuring chambers 12, 13 or 14. Shaft 30 and its eccentrically carried drive pin 29 thereby cause valve disc 19 to gyrate edgewise across the top edges of partitions 20 in a manner to open up and cut off fluid communication not only between distributing chamber 15 and the passageways which lead to the measuring chambers but also between these measuring chambers and the central well 21. In the usual manner of the Sprague type of meter, valve disc 19 thus controls and times the intake and output of gas with respect to each of the measuring chambers. The disc carried boss 26 as usual impels a radial arm 27 to drive the register 28.

If this timing of the intake and output of gas is found to require correction, screw plug 43 may be removed from its hole 42 in the meter casing wall and a wrench (not shown) may be inserted through this hole to reach and turn the adjusting screw 49 in either direction. This will change the angular or rotative relation of arm 45 to shaft 30 in a finely controllable degree.

If upon comparison of the register reading with a test standard it is found that the register indication is incorrect, for the true amount of gas which has passed through the meter, the same wrench may be employed at the same time to turn adjuster screw 72 in either direction. This will slide block 64 either toward or away from the axis of shaft 30. At the same time, bevel pinion 78 will turn bevel pinion 94 through the medium of idler pinion 95 so as simultaneously to shift the collar device 87 toward or away from this same axis of the crank structure an amount exactly equal to the corresponding adjustive movement of crank pin device 64. The threads on screws 72 and 93 are such that block 64 and collar device 87 move simultaneously through exactly equal distances either toward or away from crank axis X. A strong frictional cling of block head 63 and thrust washer 82 to the guideways 61 under the pressure exerting urge of spring 84 provides sufficient resistance to any accidental turning of screws 72 and 93 dependably to maintain whatever adjustment is established.

The above described simultaneous adjustment of the distances from the crank axis X to the points of pivotal connections of both links 34 and 35 will be seen to alter to exactly like extent the distance through which each of diaphragms 24 and 25 moves corresponding to one full revolution of crank structure 33. The passage of a given volume of gas through the meter will therefore cause the register to indicate an increased or reduced amount of gas consumption while both diaphragms continue to flex reciprocatively through like distances. In this manner the meter reading and performance may be calibrated as desired without, as has heretofore been the practice, inflicting upon one of the meter diaphragms a greater amount of flexural fatiguing movement than is performed by the other diaphragm.

With particular reference to Fig. 10, it will be observed that if the parts are so constructed and related that the angle A, say forty degrees between the line of adjustive movement of collar device 87 and the axis of idler pinion 95, exactly equals the angle B between the line of adjustive movement of crank pin block 64 and the said axis of idler pinion 95, then each of the three bevel pinions may be made with the same number of teeth, assuming that each of screws 72 and 93 are given the same number of threads per inch. Fig. 13 shows both block 64 and collar device 87 shifted to their radial outermost positions which increases the effective throw of both arms of the crank to a maximum, while Fig. 14 shows these same parts adjusted to their radially innermost positions which decreases the effective throw of both arms of the crank to its minimum.

Fig. 15 illustrates a modified form of construction in which only two intermeshed beveled gears 97 and 98 are employed and respectively fixed on the shanks of screws 72' and 72 in the same manner as pinions 94 and 78 respectively. In this case the idler pinion 95 is omitted. If angle C in Fig. 15 is maintained equal to the sum of angles A and B in Fig. 10, bevel gears 97 and 98 must be larger in diameter and require a modified shape of opening 99 in crank plate 59. The single pair of bevel gears of Fig. 15 will, of course, result in screws 72' and 72 being rotated in respectively opposite directions so that the thread on one of these screws, as for instance 72', will be made a left hand thread while the thread on the other screw 72 can remain a right hand thread to cause simultaneous inward movements or simultaneous outward movements of the collar device and the crank pin device.

It will be understood in regard to the constructions of both Fig. 10 and Fig. 15 that the metal of crank plate 59, if die cast, may be molded about the shanks of screws 72, 93, 72' and shaft 96 to form free bearings therefor.

The metal of crank plate 59 may be molded about the unthreaded shank of screw 72, 72' and/or screw 93 in a way to produce a clinging fit offering yieldable resistance to turning of these screws and thus help guard against accidental disturbance of established adjustments of the plural crank arm lengths. Also it will be understood that screw 93 instead of screw 72 may have its unthreaded shank elongated and extend past axis X to project from the crank plate 59 and thereat be flatted or squared to receive the hereinbefore mentioned adjusting wrench. The angles A and B may each suitably be forty degrees.

The novel principles underlying the present improvements may be seized upon and embodied in constructions and relationships of parts differing from those herein chosen for the purpose of illustrating the invention, and the appended claims are intended to cover all substitutes and equivalents that would be suggested by the disclosure hereof or which come within the fair meaning of their terms.

I claim:

1. In register driving apparatus for gas meters including a rigid crank structure rotatable about a crank axis and comprising a crank plate held fast to a crank arm by a post eccentric to said axis affording axial space between said plate and arm, the combination with said crank structure of, a collar device within said axial space surrounding said post and shiftable relative thereto, means restricting shifting movement of said collar device to directions toward or away from said crank axis, a crank pin device angularly spaced from said post in the path of rotation of said crank structure adjustably carried by said plate in a manner to project away from said space in a direction parallel to said axis, a push-pull screw having threaded and unthreaded sections one of which sections so operatively engages with said crank structure and the other of which sections so cooperatively engages with said collar device that turning of said screw shifts said collar device toward or away from said crank axis, and connections between said screw and said crank pin device constructed and arranged to convert said turning movement of the former into adjustive movement of the latter relative to said crank structure.

2. In a flow meter, fluid operated mechanism including the combination of, a crank plate rotatable about a pivotal axis, a crank pin device carried by said plate and adjustable relative thereto to positions relatively near and relatively far from said axis, means to constrain said device to a predetermined path of adjustive movement, a post fixed on said crank plate angularly spaced from said crank pin device in a path of rotation about said axis, a collar device surrounding said post constructed and arranged to be adjustable in relation thereto to positions relatively near and relatively far from said axis, means to constrain said collar device to a predetermined path of adjustive movement, and a plurality of push-pull screws operatively interconnected and arranged to shift said devices at the same time and in equal increments of adjustive movement either toward said relatively near positions or toward said relatively far positions.

3. In a flow meter, fluid operated mechanism including the combination of, a crank plate rotatable about a pivotal axis, a crank pin device carried by said plate and adjustable relative thereto to positions relatively near and relatively far from said axis, means to constrain said device to a predetermined path of adjustive movement, a post fixed on said crank plate angularly spaced from said crank pin device in a path of rotation about said axis, a collar device surrounding said post constructed and arranged to be adjustable in relation thereto to positions relatively near and relatively far from said axis, means to constrain said collar device to a predetermined path of adjustive movement, a plurality of push-pull screws operatively arranged to shift said devices toward said relatively near positions and toward said relatively far positions, and operative connections between said screws restricting turning of the latter to predetermined rotary relationships.

4. In a flow meter, fluid operated mechanism including the combination defined in claim 3, in which the said operative connections include at least two intermeshed gears.

5. In a flow meter, fluid operated mechanism including the combination of, a crank plate rotatable about a pivotal axis, a crank pin device carried by said plate in adjustably slidable relation thereto, means to constrain said device to a straight path of adjustive movement radial to said axis, a post fixed on said crank plate angularly spaced from said crank pin device in the path of crank plate rotation, a collar device surrounding said post constructed and arranged to be adjustable in relation thereto, means to constrain said collar device to a straight path of adjustive movement radial to said axis, a plurality of push-pull screws longitudinally aligned respectively with said radial paths of adjustive movement and operatively arranged to shift said devices along said paths, and intermeshed bevel pinions operatively interconnecting said screws.

6. In a flow meter, fluid operated mechanism including the combination of, a crank plate rotatable about a pivotal axis, a crank pin device carried by said plate in adjustably slidable relation thereto, means to constrain said device to a straight path of adjustive movement radial to said axis, a post fixed on said crank plate angularly spaced from said crank pin device in the arc of crank plate rotation, a collar device surrounding said post constructed and arranged to be adjustable in relation thereto, means to constrain said collar device to a straight path of adjustive movement radial to said axis, a plurality of push-pull screws longitudinally aligned respectively with said radial paths of adjustive movement and operatively arranged to shift said devices along said paths, and at least three intermeshed bevel pinions operatively interconnecting said screws.

7. In a flow meter, fluid operated mechanism including the combination of, a crank plate rotatable about a pivotal axis, a crank pin device carried by said plate in adjustably slidable relation thereto, means to constrain said device to a straight path of adjustive movement radial to said axis, a post fixed on said crank plate angularly spaced from said crank pin device in the arc of crank plate rotation, a collar device surrounding said post constructed and arranged to be adjustable in relation thereto, means to constrain said collar device to a straight path of adjustive movement radial to said axis, a plurality of push-pull screws longitudinally aligned respectively with said radial paths of adjustive movement and operatively arranged to shift said devices along said paths, and at least three intermeshed bevel pinions operatively interconnecting said screws, the intermediate one of said bevel pinions having its axis of rotation disposed to intersect said pivotal axis of said crank plate when projected.

8. In register driving apparatus for gas meters including a rigid crank structure rotatable about a crank axis and comprising a crank plate held fast to a crank arm by a post eccentric to said axis affording axial space between said plate and arm, the combination with said crank structure of, a collar device surrounding said post and shiftable relative thereto, means restricting shifting movement of said collar device to directions toward or away from said crank axis, a crank pin device angularly spaced from said post in the arc of rotation of said crank structure adjustably carried by said plate in a manner to project away from said space in a direction parallel to said axis, a push-pull screw having a portion of its length in threaded engagement with said collar device and an unthreaded portion of its length journaled in said crank structure, another push-pull screw having a portion of its length in threaded engagement with said crank pin device and an unthreaded portion of its length journaled in said crank structure, a train of gears operatively interconnecting the unthreaded portions of said screws including at least two gear members fixed respectively on the latter, and thrust means to prevent longitudinal movement of each of said screws in relation to said crank structure.

9. In register driving apparatus as set forth in claim 8, the combination defined in said claim, in which said train of gears includes an intermediate idler gear member intermeshed with each of said fixed gear members, and in which the said crank structure is provided with an aperture occupied by all of the said gear members, said aperture having side walls serving as the said thrust means and serving also as an axial thrust abutment for said idler gear member.

10. In register driving apparatus for gas meters including a rigid crank structure rotatable about a crank axis and comprising a crank plate held fast to a crank arm by a post eccentric to said axis affording axial space between said plate and arm, the combination with said crank structure of, a collar device within said axial space surrounding said post and shiftable relative thereto, means restricting shifting movement of said collar device to directions toward or away from said crank axis, a crank pin device angularly spaced from said post in the path of rotation of said crank structure adjustably carried by said plate in a manner to project away from said space in a direction parallel to said axis, a push-pull screw having threaded and unthreaded sections one of which sections so operatively engages with said crank structure and the other of which sections so cooperatively engages with said crank pin device that turning of said screw shifts said crank pin device toward or away from said crank axis, and connections between said screw and said collar device including intermeshed gears constructed and arranged to convert said turning movement of said screw into adjustive movement of said collar device relative to said crank structure.

11. In register driving adjustable crank apparatus for flow meters, the combination of a crank plate rotatable about a given axis, a post fixed on and outstanding from said plate in a direction parallel with said axis, a collar having an opening therethrough elongated transversely thereof and occupied by said post, and means to guide said collar to positions of differing eccentricity in relation to said post including portions of said collar and crank plate mutually engaging independently of said post and externally of said opening in said collar.

12. In register driving adjustable crank apparatus for flow meters, the combination defined in claim 11, in which the said mutually engaging portions include an elongated aperture in the said crank plate and a lug carried by the said collar in offset relation to the center of the latter occupying and slidably fitting the width of said aperture.

13. In register driving adjustable crank apparatus for flow meters, the combination defined in claim 11, in which the said collar incorporates a fixed nut-like portion, together with a screw journaled in the said crank plate having threaded engagement with said nut-like portion of said collar for propelling the latter adjustively.

14. In register driving adjustable crank apparatus for flow meters, the combination defined in claim 11, in which the said crank plate contains an elongated aperture, together with a lug carried by said collar slidably occupying said aperture, and a screw journaled in said crank plate occupying said aperture and having threaded engagement with said lug.

15. In register driving adjustable crank apparatus for flow meters, the combination of a rotatable crank plate, a post fixed on said plate in perpendicular relation thereto, and an adjustable collar device comprising a hollow inverted cup surrounding said post having a roof wall containing an elongated slot through which said post extends, said cup having an external annular flange in sliding engagement with the face of said crank plate.

16. In register driving adjustable crank apparatus for flow meters, the combination of a rotatable crank plate containing an elongated aperture, a post fixed on said plate in perpendicular relation thereto, and an adjustable collar device comprising a hollow inverted cup surrounding said post having a roof wall containing an elongated slot through which said post extends, said cup having an external annular flange in sliding engagement with the face of said crank plate overlying edges of said aperture and provided with an extension forming a guide lug occupying and slidably fitting the width of said aperture.

17. In register driving apparatus as set forth in claim 8, the combination defined in said claim, in which the said crank structure is provided with an aperture occupied by the said gear members, and the said thrust means comprises side walls of said aperture arranged to be engaged by said gear members.

18. In a flow meter, fluid operated mechanism including the combination defined in claim 3, together with means frictionally resisting the shifting of at least one of the said devices by the said plurality of push-pull screws whereby the said operative connections operate to transmit such frictional resistance of said means to the other of the said devices.

ARTHUR S. McINTIRE.